(12) United States Patent
Baldwin

(10) Patent No.: US 9,456,176 B2
(45) Date of Patent: *Sep. 27, 2016

(54) IN-CALL COMMAND CONTROL

(71) Applicant: AT&T INTELLECTUAL PROPERTY I, L.P., Atlanta, GA (US)

(72) Inventor: Christopher Baldwin, Algonquin, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/279,949

(22) Filed: May 16, 2014

(65) Prior Publication Data

US 2014/0247322 A1 Sep. 4, 2014

Related U.S. Application Data

(63) Continuation of application No. 13/312,875, filed on Dec. 6, 2011, now Pat. No. 8,767,035.

(51) Int. Cl.
| | |
|---|---|
| *H04N 7/14* | (2006.01) |
| *H04N 7/15* | (2006.01) |
| *G10L 15/08* | (2006.01) |
| *G10L 15/22* | (2006.01) |
| *G06K 9/00* | (2006.01) |

(52) U.S. Cl.
CPC ............... *H04N 7/14* (2013.01); *H04N 7/152* (2013.01); *G06K 9/00355* (2013.01); *G10L 2015/088* (2013.01); *G10L 2015/223* (2013.01)

(58) Field of Classification Search
CPC ........ H04N 7/152; H04N 7/14; H04N 7/147; G10L 2015/223; G10L 2015/088; G06K 6/00355

USPC ............. 348/14.01–14.16; 704/275; 382/286
See application file for complete search history.

(56) References Cited

U.S. PATENT DOCUMENTS

| | | | |
|---|---|---|---|
| 2007/0041361 A1 | 2/2007 | Iso-Sipila | |
| 2007/0225030 A1* | 9/2007 | Teague | 455/550.1 |
| 2008/0134102 A1 | 6/2008 | Movoid et al. | |
| 2008/0165937 A1 | 7/2008 | Moore | |
| 2009/0132256 A1* | 5/2009 | Geldbach et al. | 704/275 |
| 2009/0179789 A1 | 7/2009 | Haughay, Jr. et al. | |
| 2010/0009719 A1 | 1/2010 | Oh et al. | |
| 2010/0216448 A1 | 8/2010 | Jeon et al. | |

(Continued)

OTHER PUBLICATIONS

Office Action mailed Oct. 10, 2013 for U.S. Appl. No. 13/312,875, 15 pages.

*Primary Examiner* — Melur Ramakrishnaiah
(74) *Attorney, Agent, or Firm* — Amin, Turocy & Watson, LLP

(57) ABSTRACT

Systems and methods are described that provide both a network-based, e.g., cloud-based, and apparatus based in-call command control for dynamically performing user commands such as voice commands or gesture commands. The result allows for hands free operation of a calling system including one where the user is located separate from a base station. The systems and methods provide for recognizing both voice and gestural commands. The systems and methods further provide for dynamically filtering commands so that commands are not perceived by those participating in the call. Further, the systems and methods provide for notifying the user, who has given the command, regarding the performance of the requested command.

20 Claims, 10 Drawing Sheets

(56) References Cited

U.S. PATENT DOCUMENTS

2011/0173574 A1  7/2011  Clavin et al.
2012/0166184 A1  6/2012  Locker et al.
2013/0006622 A1  1/2013  Khalil et al.
2013/0058593 A1* 3/2013  Kanalakis et al. ............ 382/286

* cited by examiner

IN-CALL COMMAND CONTROL

PRIORITY CLAIM

This patent application is a continuation of, and claims priority to, U.S. patent application Ser. No. 13/312,875, filed on Dec. 6, 2011, entitled IN-CALL COMMAND CONTROL, which is incorporated herein by reference.

TECHNICAL FIELD

The subject disclosure relates to wireless communications and, more particularly, to in-call command control.

BACKGROUND

Communications systems, networks, and devices have seen an explosive growth in past few years and, in the future, are expected to see continuing growth with respect to applications, services, and/or functionality provided to a user. One conventional communication device feature is providing both voice and video calling functionality. During a voice call, conventional communication devices relay the voice of the user of the device to participants of the voice call. Similarly, during a video call, conventional communication devices relay a video image as well as the voice of the user of the device to participants of the video call. Should a user wish to connect an additional caller to a voice call or a video call, the user can use physical inputs on the device to put the voice or video call on hold and call and connect the additional caller.

Additionally, some conventional devices utilize a voice control or gesture control software, such as, a voice-recognition or gestural-recognition application, that can perform commands based on specific auditory or gestural command. To utilize this application, the user has to actively open or turn on the feature and cannot be participating in a call. For example, the user can speak or gesture to make a call. The application can recognize the speech or gesture and perform the command, i.e., make the call.

DETAILED DESCRIPTION

Figure 1:
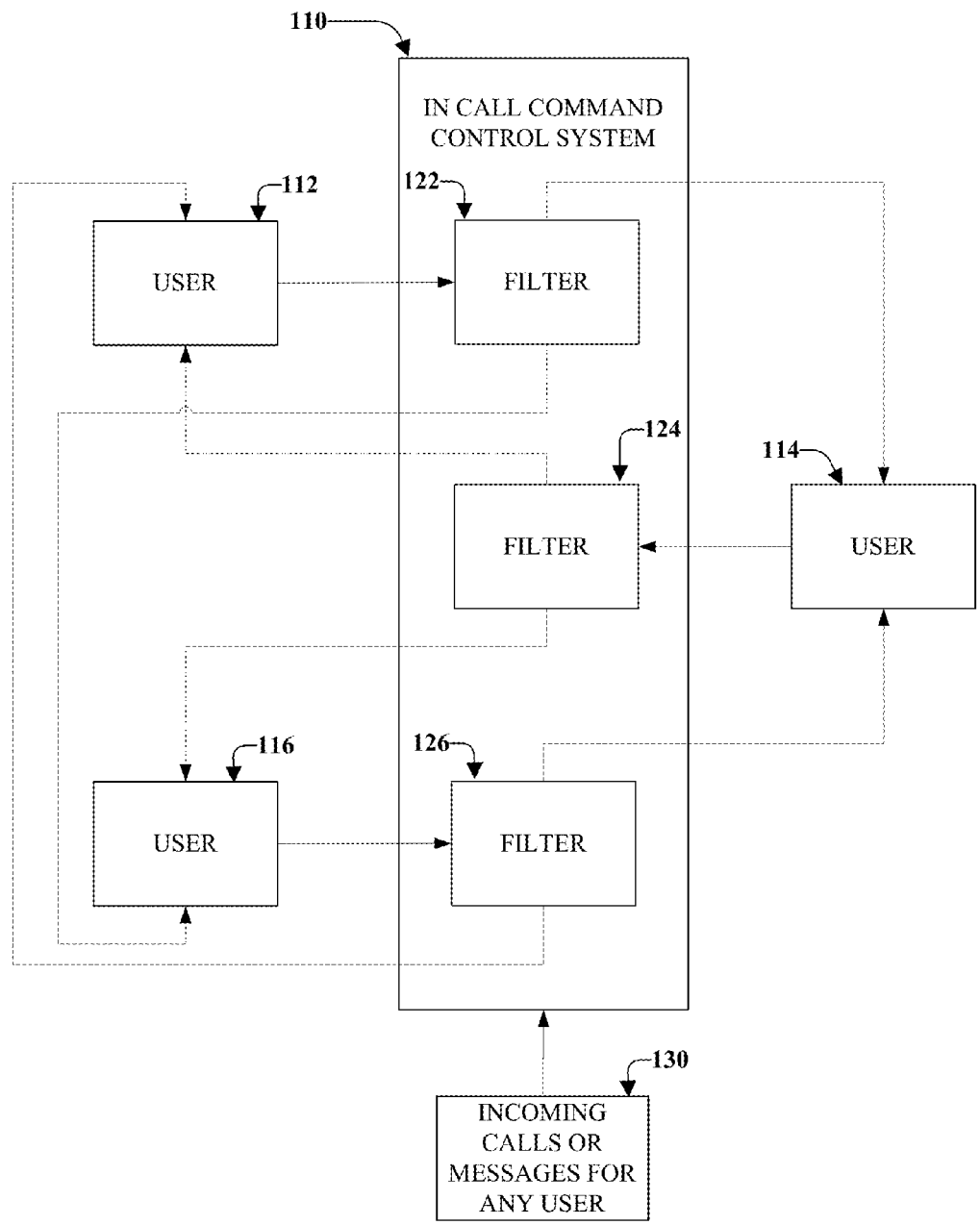
FIG. 1 illustrates an example in-call command control system interacting with three users.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "service," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include input and/or output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the words "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," and similar terminology, refer to a wired or wireless device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Likewise, the terms "access point," "base station," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, the terms "data flow," "data session," and the like are also employed interchangeably throughout the subject specification, unless context warrants particular distinction(s) among the terms.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Aspects or features of the subject innovation can be exploited in substantially any wired or wireless communication technology; e.g., Universal Mobile Telecommunications System (UMTS), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Zigbee, or another IEEE 802.XX technology. Additionally, substantially all aspects of the subject innovation can be exploited in legacy telecommunication technologies.

The design of modern telecommunication devices and the way in which they are used during voice calls can make it inconvenient or downright difficult to operate them effectively. The use of popular hands free systems like wired and wireless headsets and Bluetooth links to in car systems can aggravate the problem further. When considering this issue in the context of conference calls, the complexities involved can make this a herculean task for a novice. A user accessing a call through a blue-tooth headset may not be near a base station to press buttons associated with in-call commands such as placing a call on hold, muting, placing a second call, etc.

Systems and method are disclosed herein that employ voice or gesture controls that operate various in call systems and functions. Calls can be passed through a system designed to recognize and implement voice commands or gesture commands for call functions. This system can exist within the circuit switched core for older technologies, in the data packet core for new technologies, it could be offered as a cloud based service, or it could exist within a handset/device itself.

Systems and methods disclosed herein can act directly on a call to implement the instructions. This can allow the system to filter the communication between the system and the user so it is not perceived by the other participant(s) on the call. This communication could be a user asking the system to put the current call on hold, a user asking the system to merge two calls, a user wishing to isolate multiple users in a conference call so as to engage in a discussion with a single participant, the system informing the user of the identity of another incoming call, etc. This system could enable the use of voice or gesture only multitasking.

Referring initially to FIG. 1, there illustrated is an example in-call command control system 110 interacting with user 112, user 114, and user 116. User 112 can send video or audio related to a call with users 114 and 116. A portion of the video or audio can also be a voice or gesture command. Filter 122 can filter the voice or gesture command and send the filtered audio or video to users 114 and 116. It can be appreciated that filter 122 can send differing audio or video feeds to users 114 and 116 respectively. For example, user 112 might give a voice command to isolate user 114. Filter 122 can filter the voice command from being heard by user 114 and 116. Filter 122 and filter 124 can then work in harmony to isolate a conversation between user 112 and user 114 that is not perceived by user 116. It can be appreciated that filter 122, filter 124, and filter 126 need not be separate components as depicted in FIG. 1 and can be, for example, a singular intelligent filter.

In another example, user 112 can put users 114 and 116 on hold, and receive an incoming call 130. Filter 122 can prevent user 114 and user 116 from perceiving user 112 talking to an incoming call 130. In still another example, user 112 can merge the incoming call 130 with user 114 and user 116. Additional examples of a command can include self muting, muting of other participants, filtering speech while retaining background noise, engaging in a discussion with a single conference call participant, placing a call while maintaining a presence within a conference call, informing the user of the identify of another incoming call, drafting an email based on voice recognition, sending an email, drafting and sending an SMS message, opening a web browser, searching an email inbox, etc. It can be appreciated that voice or gesture commands can be established for conceivably any network communication function or device function.

Similarly, user 114 and user 116 can also send both video or audio related to the conversation as well as a voice or gesture command to in command control system 110. Filter 124 and filter 126 respectively can filter the voice or gesture command and send the audio or video related to the conversation to user 114. In call command control system 110 can then perform the command given by user 114 and filtered by filter 116. It can be appreciated that in call command control system 110 can independently accept and perform commands for each user of the system simultaneously.

Figure 2:
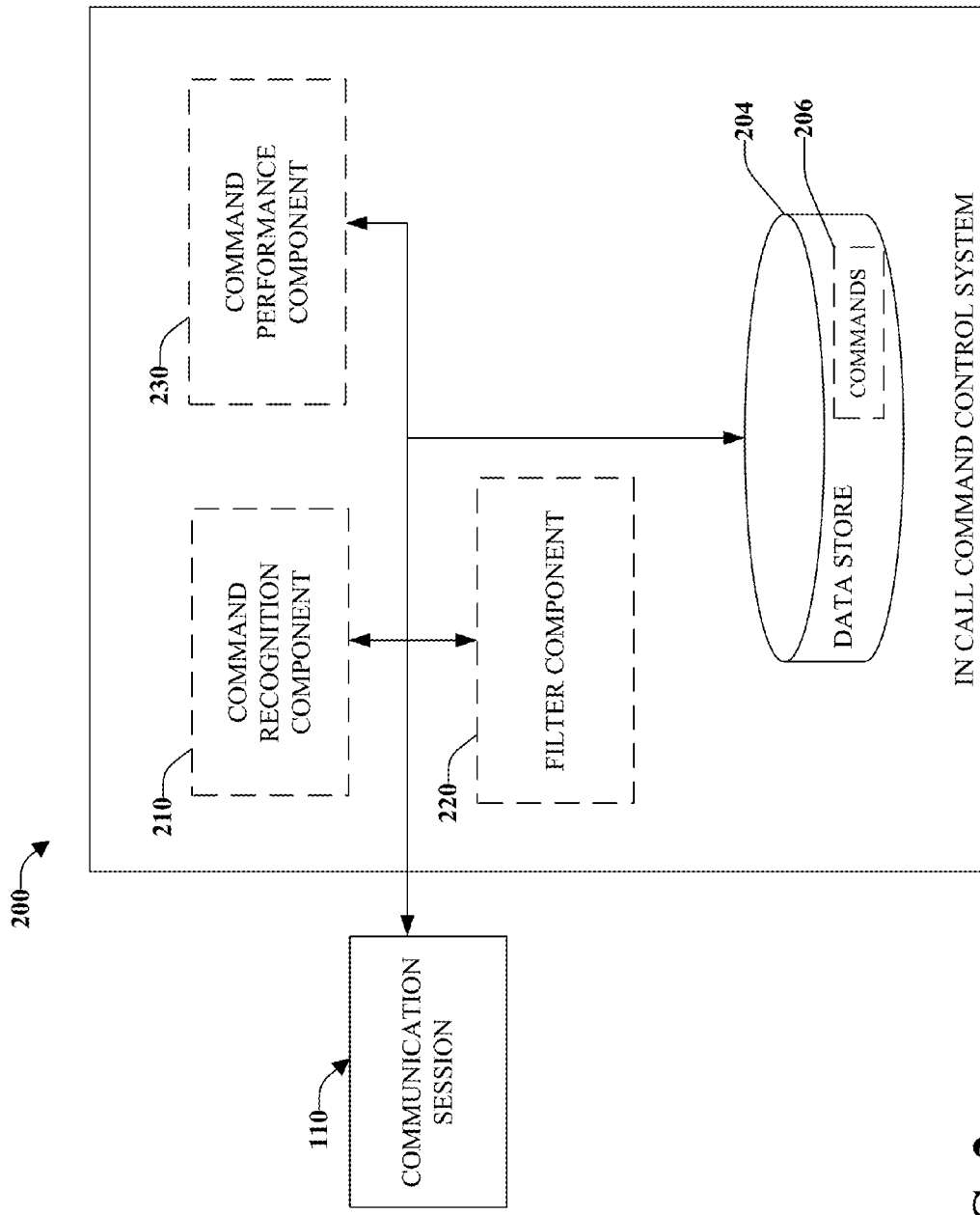
FIG. 2 illustrates an example in-call command control system.

Referring now to FIG. 2, there is illustrated an example system 200 that can be used for in-call command control. According to an aspect, at least a portion of the system 200 can reside within a network, for example, a cloud. As an example, a cloud can include resources (e.g., processing resource(s), data storage resource(s), etc.) that can reside on-premise or off-premise at a service provider location. Moreover, the cloud can be, but is not limited to, a public cloud, a private cloud, an inter-cloud, or a hybrid cloud. Typically, users can opt-in to utilize the in-call command control system 200, by adjusting appropriate privacy settings.

In-call command control system 200 can include a command recognition component 210 that monitors a communication session 110 between a set of user equipments for a command associated with a user equipment. For example, command recognition component 210 can include voice recognition capability wherein it actively monitors communication session 110 for voice commands. It can be appreciated that communication session 110.

Communication session 110 can contain two or more user equipments ("UE"). A UE can include most any electronic communication device such as, but not limited to, most any consumer electronic device, for example, a tablet computer, a digital media player, a digital photo frame, a digital camera, a cellular phone, a personal computer, a personal digital assistant (PDA), a smart phone, a laptop, a gaming system, etc. Further, a UE can also include LTE based devices, such as, but not limited to, most any home or commercial appliance that includes an LTE radio. It can be appreciated that the UE can be mobile, have limited mobility and/or be stationary.

In one embodiment, voice commands can be identified by an action word associated with a user requesting a command. For example, the word "COMMAND" can signify that a user is attempting to address the command recognition component and can be followed with a specific command request. A user wishing to place a call on hold may state "COMMAND" followed by "HOLD". It can be appreciated that a word, having no real world usage, can be created and implemented as a command word in order to avoid a situation where command recognition component 210 falsely identifies part of the conversation as a command. It can be further appreciated that many different possible implementations exist for allowing a user to make commands within communication session 110, including, in an alternate embodiment, natural language processing to infer a requested action.

In addition to voice commands, in one embodiment, command recognition component 210 can also recognize gesture commands. For example, if the communication session 110 is a video conference or a video call, video associated with communication session 110 can be analyzed using motion tracking algorithms to identify a user command made via gesture. For example, a user covering their mouth with their hand can signify the user's desire to mute the conversation. In another example, a swipe of the hand can signify a user's desire to place the call on hold. It can be appreciated that any number of gestural commands can be enacted and associated with specific commands.

In-call command control system 200 can also include a filter component 220 that can dynamically filter the command from the communication session. For example, for a voice command, filter component 220 can prevent the voice command from being perceived within communication session 110 by filtering the voice command. In one embodiment, a delay can be incorporated by in-call command control system 200 from users within communication session 110. For example, the delay can allow command recognition component 210 to recognize the command and filter component 220 to filter the command prior to it being perceived within communication session 110. It can be appreciated that a command word can be chosen that has auditory onsets capable of being recognized by command recognition component 210 faster than a delay imposed by in-call command control system 200. In one embodiment, background noise not related to a voice command can be retained by filter component 220. It can be appreciated that by retaining background noise, other participants of communication session 110 may not perceive that a user has issued a command that has been filtered.

Filter component 220 can also filter gestural or voice commands from communication session 110 that is a video call. It can be appreciated that one embodiment, filter component 220 can filter both gestural commands and voice commands or unrelated speech occurring during a gestural command. For example, a participant in communication session 110 should not perceive someone speaking, i.e. giving a voice command, within a video call without hearing words. Alternatively, a participant in communication session 110 should not perceive a command gesture intended for in-call command control system 200.

In one embodiment, a static image can be recorded by filter component 220 prior to the gestural command or voice command. Filter component 220 can display the static image instead of the live or delayed video containing a user command. In one embodiment, the static image can be recorded immediately prior to the recognition of a command by command recognition component 210 to minimize the potential that the command is perceived within communication session 110.

In another embodiment, a video loop can be recorded prior to a gesture command or voice command. Filter component 220 can then display the video loop instead of the live or delayed video containing a user command. It can be appreciated that the video loop can be recorded immediately prior to the recognition of a command by command recognition component 210 to minimize the potential that the command is perceived within communication session 110. It can be appreciated that a static image shown to communication session 110 may be detected by participants of communications session 110. A video loop instead may be a better filter in those circumstances. It can be further appreciated that a background in a video call can dictate whether a static image or a video loop may be the best implementation. For example, filter component 220 can detect movement levels within a video loop and if the movement levels reach an undesirable threshold display a static image instead of the video loop.

In-call command control system 200 can also include a command performance component 230 that can dynamically perform the command. For example, command performance component 230 can place calls, put calls on hold, isolate participants in a conference call, look up information, report information, merge calls, recite incoming message including SMS messages or emails, send an SMS message, send an email, etc. It can be appreciated that the command component 230 can perform any network functionality and is not dependent on the device that is connected. In one embodiment, in-call command control system resides on the cloud and can perform functions on the cloud that a device may not be able to perform on its own. For example, a user connecting to communication session 110 using a landline phone may issue a command to send an SMS message to a user even though the landline phone itself is incapable of sending such a message.

Command performance component 230 can utilize data store 204 containing commands 206 in dynamically performing commands. For example, commands 206 may contain algorithms for performing specific commands. In addition, commands 206 may contain a list of all possible commands that a user may perform.

Consider an example scenario where a user with a mobile device, such as a smartphone, is participating in a conference call (i.e., communication session 110) while driving home from the office. The user can determine that the assistance of one of his peers is needed in order to resolve the issue being discussed. He can command the system to place his current call on hold. Command recognition component 210 can recognize the command. Filter component 220 can filter the command from communication session 110. Command performance component 230 can then dynamically place the call on hold. The user's phone is capable of initiating a call via voice control so he asks his phone to initiate a call to his peer. Alternatively, the user could command in-call command control system 200 to initiate a call to his peer. When his peer answers the phone, the user explains the situation and then asks the in-call command control system 200 to merge the two calls together. Command recognition component 210 can recognize the command. Filter component 220 can filter the command from communication session 110. Command performance component 230 can then dynamically merge the calls together. Without the in-call command control system 200 the user may have to fumble with his mobile device while trying to participate in a discussion, putting the call on hold, calling his peer, and merging the calls. Additionally, some jurisdictions may have laws making it illegal to use one's hands to perform operations, such as placing a call on hold or merging calls, while driving.

Figure 3:
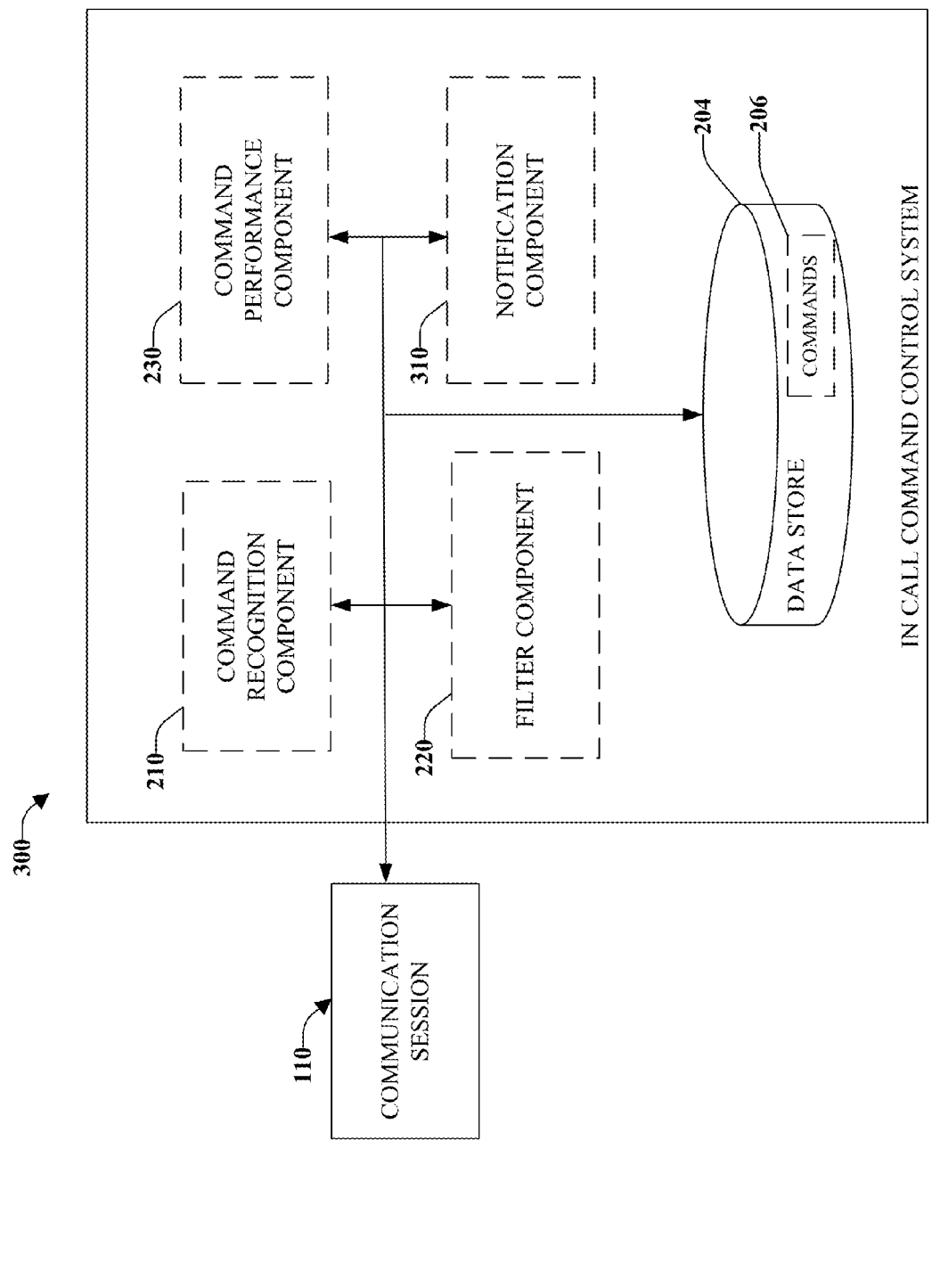
FIG. 3 illustrates an example in-call command control system including a notification component.

Turning now to FIG. 3, there is illustrated an example in-call command control system 300 including a notification component 310 that can be generate a notification to the user equipment within the communication session based on the command. For example, the notification may alert the user requesting the performance of a command the success or failure of the performance. The notification can also include the return of requested information. In one embodiment, the notification can be a brief tone indicating the successful performance of the command. In another embodiment, the notification can be speech that states the result of the requested performance of the command. It is noted that not every command requires a notification to the user requesting the performance of the command. It can be further appreciated that the notification component can notify individual users within communication session 110 without alerting other users within communication session 110.

In an example scenario, a user on a conference call (i.e., communication session 110) is presenting a proposal with two of his peers to a group of potential investors. One of the users' peers has not joined the call and rather than inconvenience potential investors, he begins the presentation without him. Part way through the presentation he realizes that he does not have any notes for the quickly approaching slides his absent peer was to present. Knowing he can use the in-call command control system 300, he can pause and ask for thoughts and suggestions allowing the investors to speak and cleverly giving himself a chance to discuss this with his other peer. He can command the in-call command control system 300 to isolate himself and his peer so they can discuss this while still listening to the investors. Command recognition component 210 can recognize the command. Filter component 220 can filter the command from communication session 110. Command performance component 230 can then dynamically isolate the user and his peer. The user can then ask his peer to run to the office of their absent colleague and retrieve his notes so they can present his slides. The user then commands in-call command control system 200 to return them to the conference call. Command recognition component 210 can recognize the command. Filter component 220 can filter the command from communication session 110. Command performance component 230 can then dynamically return them to the conference call where the user can ask a few questions to buy some time. The notification component 310 can alert him that he has a voice message from his peer that ran to fetch the notes. He can then command the in-call command control system 300 to play the message while the investors are talking. Filter component 220 can filter the command from communication session 110. Command performance component 230 can then dynamically play the message solely to the user. The message informs him that the notes were not in the office but that he had spoken with the absent peer and that the absent peer was just arriving and would join the conference call shortly. He then commands in-call command control system 200 to return him to the conference call where he asked a few more questions to buy some time. The absent peer joined the call and was able to present his portion of the presentation. Without the system and method presented in this disclosure, this would be difficult to accomplish without the investors detecting something was amiss, thereby potentially causing them to rethink their investment.

Figure 4:
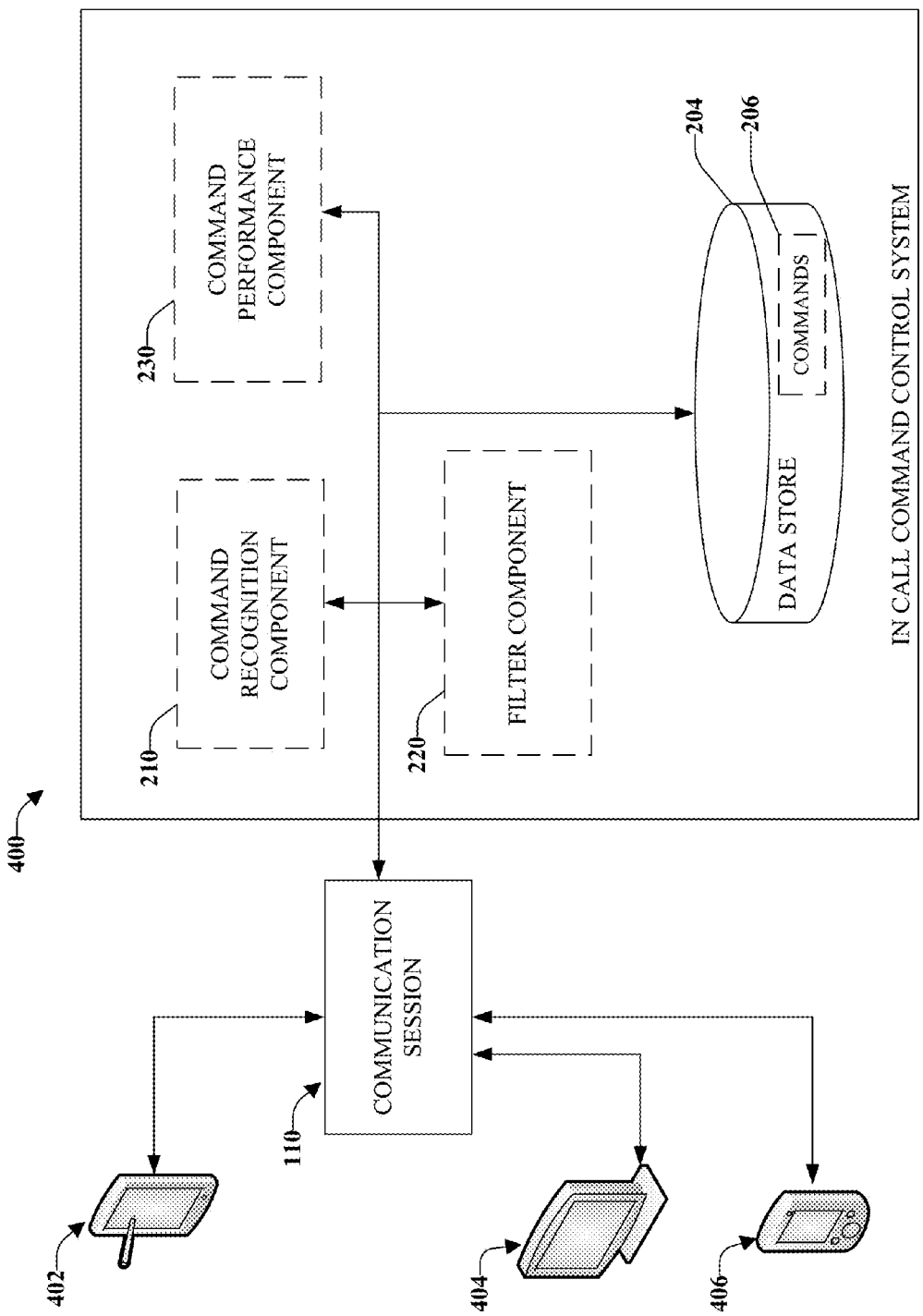
FIG. 4 illustrates an example in-call command control system using communication channels associated with call participants.

Turning now to FIG. 4, there is illustrated an example in-call command control system 400 using communication channels associated with call participants. Devices 402, 404, and 406 are connected to communication session 110 via separate communication channels. Each communication channel can be associated with a participant of communication session 110. Command recognition component 210 can independently monitor each communication channel for commands. Filter component 220 can dynamically filter commands based on the channel that gave the command and the command given. Command performance component 230 can then perform commands such as, for example, merging calls or isolating calls, using the communication channels. It can be appreciated that by using individual communication channels, in-call control system 400 can selectively control what each participant to communication session 110 hears or views.

Figure 5:
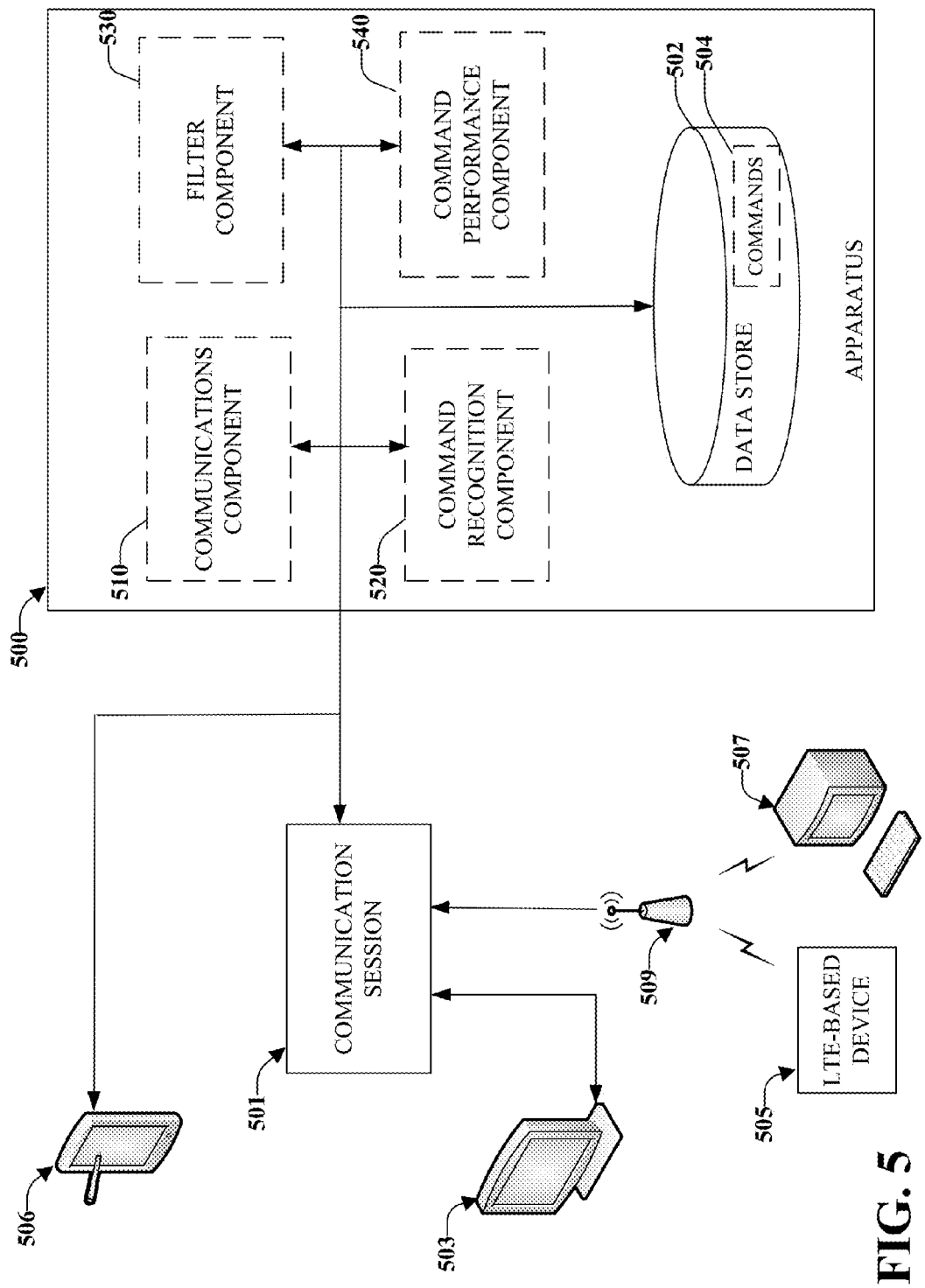
FIG. 5 illustrates an example apparatus capable of participating in a communication session while using in-call command control.

Turning now to FIG. 5, there is illustrated an example apparatus 500 capable of participating in a communication session 501 while using in-call command control. The apparatus can be a UE. A communications component 510 can generate a communication session between a user of the apparatus and a set of participants. The communication session 501 can be a conference call between UE 503, UE 505 and UE 507. UE 505 and UE 507 can connect to communication session 501 using a femtocell 509. In one embodiment, communications component 510 can function independently to dynamically adjust the information sent from apparatus 500 to communication session 501. In an alternative embodiment, communications component 510 can function together with filter component 530, described below, to dynamically adjust the information sent from apparatus 500 to communication session 501.

A command recognition component 520 can monitor the communication session for a command by the user. For example, command recognition component 210 can include voice recognition capability wherein it actively monitors the user of apparatus of 500 for voice commands.

In one embodiment, voice commands can be identified by an action word associated with a user requesting a command. For example, the word "COMMAND" can signify that a user is attempting to address the command recognition component and can be followed with a specific command request. A user wishing to place a call on hold may state "COMMAND" followed by "HOLD". It can be appreciated that a word, having no real world usage, can be created an implemented as a command word in order to avoid a situation where command recognition component 520 falsely identifies part of the conversation as a command. It can be further appreciated that many different possible implementations exist for allowing a user to make commands, including, in an alternate embodiment, natural language processing to infer a requested action.

In addition to voice commands, in one embodiment, command recognition component 520 can also recognize gesture commands. For example, if the communication session 501 generated by communications component 510 is a video conference or a video call, video associated with communication session 110 can be analyzed using motion tracking algorithms to identify a user command made via gesture. For example, a user covering their mouth with their hand can signify the user's desire to mute the conversation. In another example, a swipe of the hand can signify a user's desire to place the call on hold. It can be appreciated that any number of gestural commands can be enacted and associated with specific commands.

A filter component 530 can dynamically filter the command from the communication session. For example, for a voice command, filter component 530 can prevent the voice command from being perceived within communication session 501 by filtering the voice command. In one embodiment, a delay can be incorporated by communications component 510 in sending voice or video data to communication session 501. For example, the delay can allow command recognition component 512 to recognize the command and filter component 530 to filter the command prior to it being sent to communication session 501. It can be appreciated that a command word can be chosen that has auditory onsets capable of being recognized by command recognition component 520 faster than a delay imposed by communication component 510. In one embodiment, background noise not related to a voice command can be retained by filter component 530. It can be appreciated that by retaining background noise, other participants of communication session 501 may not perceive that a user has issued a command that has been filtered.

Filter component 530 can also filter gestural or voice commands from being sent to communication session 501 where the communication session 501 is a video call, video conference, or the like. It can be appreciated that filter component 530 can filter both gestural commands and voice commands or unrelated speech occurring during a gestural command. For example, UE 503, UE 505, and UE 507 should not perceive a user of apparatus 500 speaking, i.e. giving a voice command, within a video call without hearing words. Alternatively, UE 503, UE 505, and UE 507 should not perceive a user of apparatus 500 giving a command gesture.

In one embodiment, a static image can be recorded by filter component 530 prior to the gestural command or voice command. Filter component 530 independently or in conjunction with communications component 510 can display the static image instead of the live or delayed video containing a user command. In one embodiment, the static image can be recorded immediately prior to the recognition of a command by command recognition component 520 to minimize the potential that the command is perceived within communication session 501.

In another embodiment, a video loop can be recorded prior to a gesture command or voice command. Filter component 530 independently or in conjunction with communications component 510 can then display the video loop instead of the live or delayed video containing a user command. It can be appreciated that the video loop can be recorded immediately prior to the recognition of a command by command recognition component 520 to minimize the potential that the command is perceived within communication session 501. It can be appreciated that a static image displayed within communication session 501 may be detected by UE 503, UE 505, or UE 507. A video loop instead may be a better filter in those circumstances. It can be further appreciated that a background in a video call can dictate whether a static image or a video loop may be the best implementation. For example, filter component 530 can detect movement levels within a video loop of apparatus 500 and if the movement levels reach an undesirable threshold display a static image instead of the video loop.

A command performance 540 component can dynamically perform the command. For example, command performance component 540 can place calls, put calls on hold, look up information, report information, merge calls, recite incoming messages including SMS messages or emails, send an SMS message, send an email, etc. For example a user of apparatus 500 on a call with UE 503, UE 505 and UE 507 can issue a command to connect to UE 506. The user can hold a side conversation with UE 506 and later the user can merge its call with UE 506 into communication session 501 with UE 503, UE 505, and UE 507.

Command performance component 540 can utilize data store 502 containing commands 504 in dynamically performing commands. For example, commands 504 may contain algorithms for performing specific commands. In addition, commands 504 may contain a list of all possible commands that a user may perform.

Figure 6:
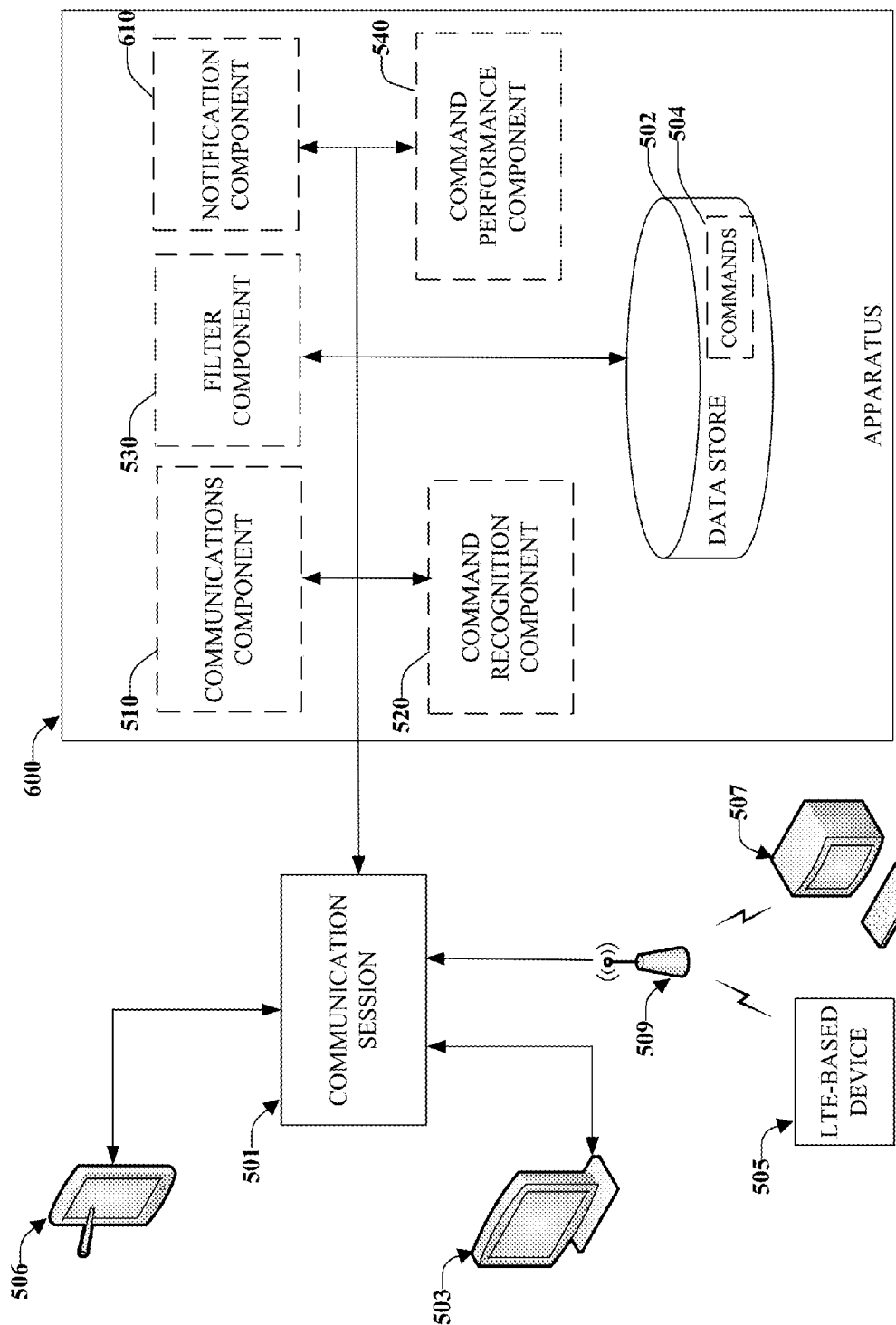
FIG. 6 illustrates an example apparatus capable of participating in a communication session while using in-call command control including a notification component.

Turning now to FIG. 6, there is illustrated an example apparatus 600 capable of participating in a communication session while using in-call command control including a notification component 610 that can generate a notification to the user within the communication session 501 based on a command. For example, notification component 610 can alert the user requesting the performance of a command the success or failure of the performance. The notification can also include the return of requested information. In one embodiment, the notification can be a brief tone indicating the successful performance of the command. In another embodiment, the notification can be speech that states the result of the requested performance of the command. It can be appreciated that every command need not require a notification to the user requesting the performance of the command. It can be further appreciated that notification component 610 can notify the user without the notification being perceived by UE 506, UE 503, UE 505, or UE 507 within communication session 501.

Figure 7:
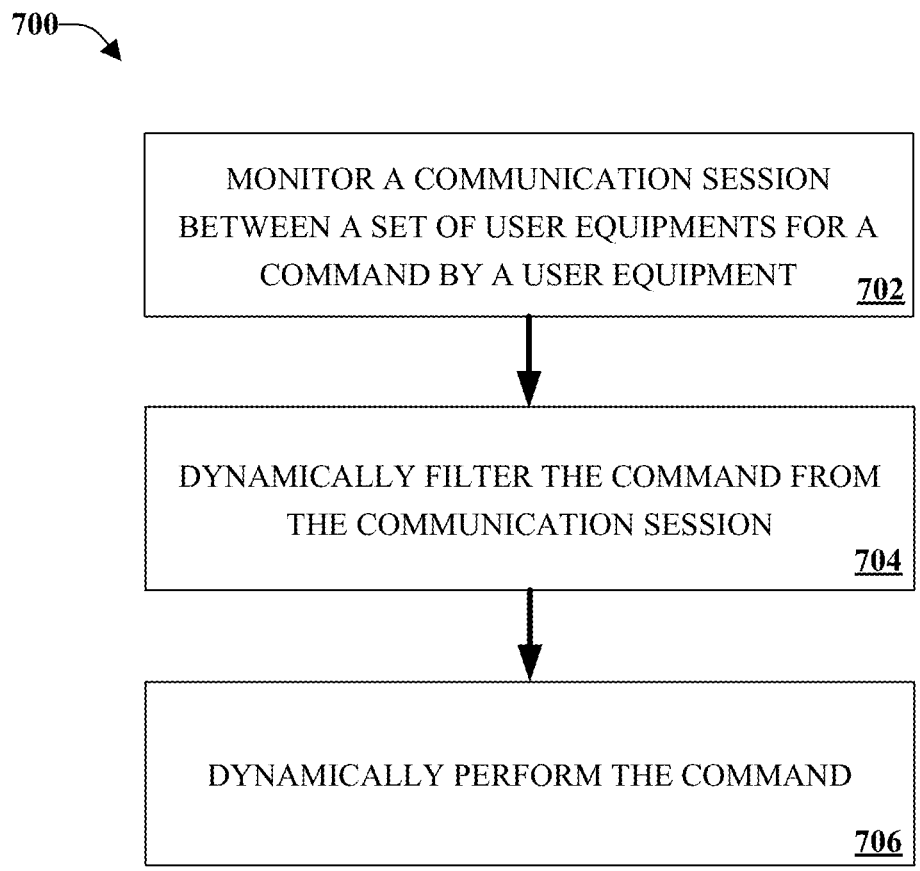
FIG. 7 illustrates an example method for in-call command control.
Figure 8:
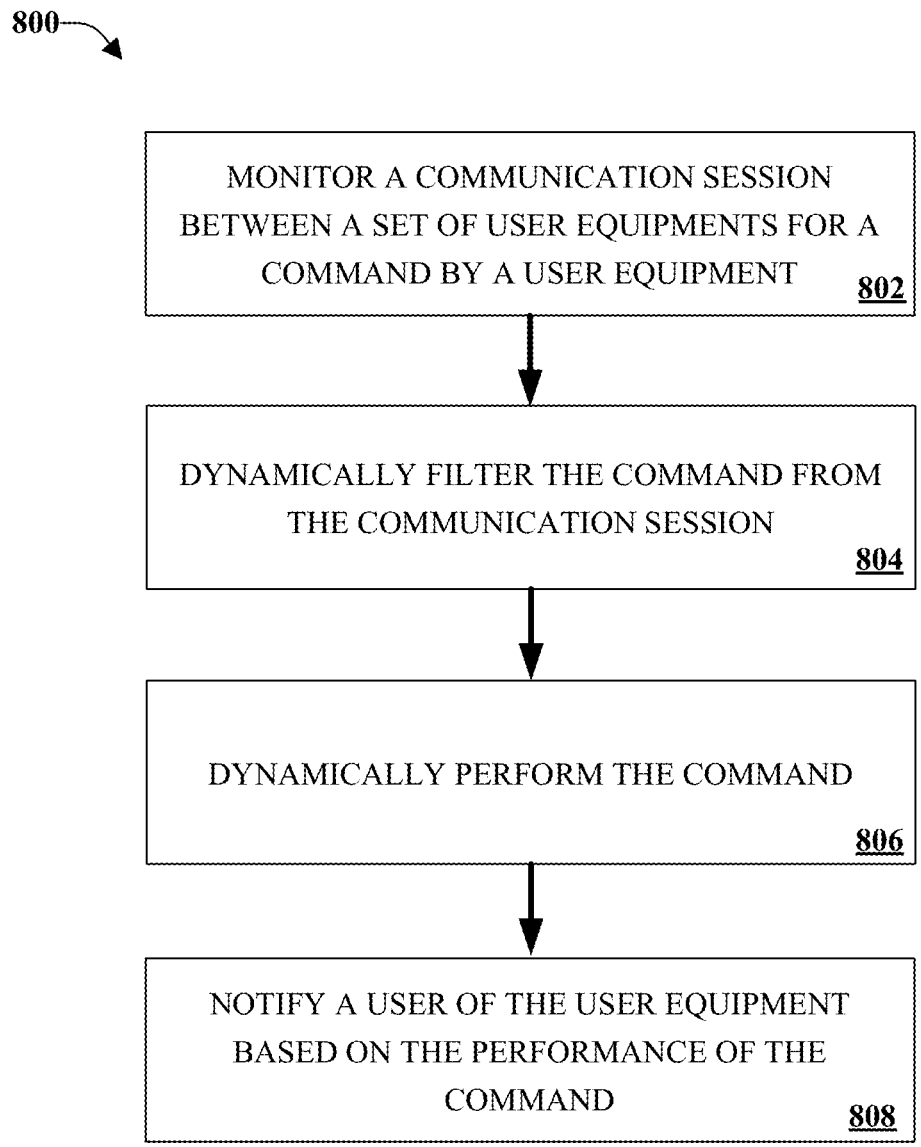
FIG. 8 illustrates an example method for in-call command control including notifying a user regarding the control.

FIGS. 7-8 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system and apparatus diagrams. It is to be appreciated that the detailed description of such acts in the prior figures can be and are intended to be implementable in accordance with the following methods.

Turning now to FIG. 7, there is illustrated example method 700 for in-call command control. At 702 the method provides for monitoring, by a network entity, a communication session between a set of user equipments to identify a command associated with a user equipment. It can be appreciated that the network entity can be either hardware or software. At 704, in response to identification of the command, the method provides for dynamically filtering the command from the communication session and at 706 performing the command.

Turning now to FIG. 8, there is illustrated example method 800 for in-call command control including user notification. At 802 the method provides for monitoring, by a network entity, a communication session between a set of user equipments to identify a command associated with a user equipment. At 804, in response to identification of the command, the method provides for dynamically filtering the command from the communication session and at 806 performing the command. At 808, a user of the user equipment can be notified based on the performance of the command.

Figure 9:
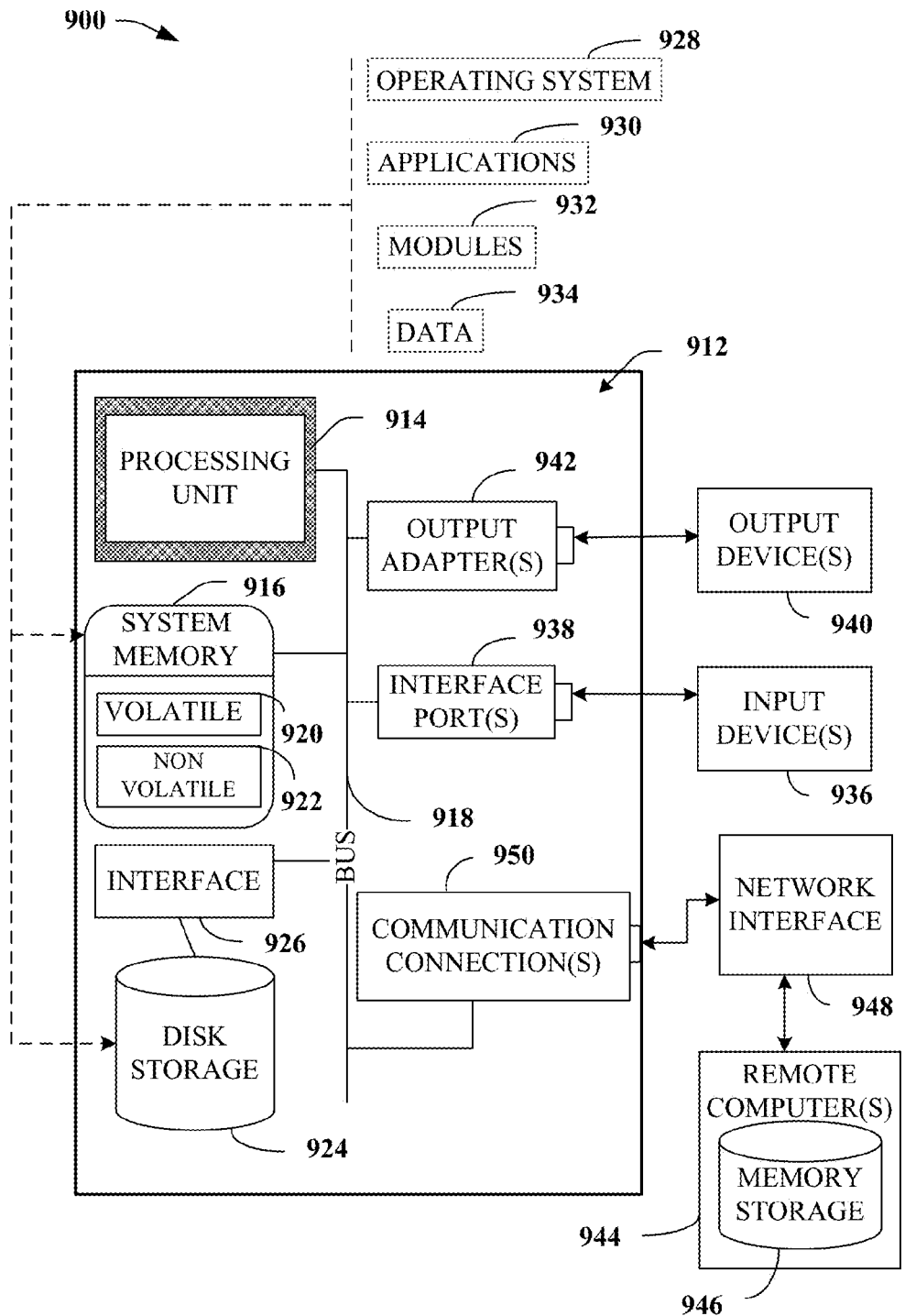
FIG. 9 illustrates a block diagram of a computer operable to execute the disclosed communication architecture.

Turning now to FIG. 9 there illustrated is a block diagram of a computing system 900 operable to execute the disclosed systems and methods in accordance with an embodiment. Computer 912 (which can be, for example, part of the hardware of a component includes a processing unit 914, a system memory 916, and a system bus 918. System bus 918 couples system components including, but not limited to, system memory 916 to processing unit 914. Processing unit 914 can be any of various available processors. Dual microprocessors and other multiprocessor architectures also can be employed as processing unit 914.

System bus 918 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1194), and Small Computer Systems Interface (SCSI).

System memory 916 includes volatile memory 920 and nonvolatile memory 922. A basic input/output system (BIOS), containing routines to transfer information between elements within computer 912, such as during start-up, can be stored in nonvolatile memory 922. By way of illustration, and not limitation, nonvolatile memory 922 can include ROM, PROM, EPROM, EEPROM, or flash memory. Volatile memory 920 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 912 also includes removable/non-removable, volatile/non-volatile computer storage media. FIG. 9 illustrates, for example, disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to system bus 918, a removable or non-removable interface is typically used, such as interface 926.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 9 describes software that acts as an intermediary between users and computer resources described in suitable operating environment 900. Such software includes an operating system 928. Operating system 928, which can be stored on disk storage 924, acts to control and allocate resources of computer system 912. System applications 930 take advantage of the management of resources by operating system 928 through program modules 932 and program data 934 stored either in system memory 916 or on disk storage 924. It is to be noted that the disclosed subject matter can be implemented with various operating systems or combinations of operating systems.

A user can enter commands or information into computer 911 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 914 through system bus 918 by way of interface port(s) 938. Interface port(s) 938 include, for example, a serial port, a parallel port, a game port, a universal serial bus (USB), an infrared port, a Bluetooth port, an IP port, or a logical port associated with a wireless service, etc. Output device(s) 940 use some of the same type of ports as input device(s) 936.

Thus, for example, a USB port can be used to provide input to computer 912 and to output information from computer 912 to an output device 940. Output adapter 942 is provided to illustrate that there are some output devices 940 like monitors, speakers, and printers, among other output devices 940, which use special adapters. Output adapters 942 include, by way of illustration and not limitation, video and sound cards that provide means of connection between output device 940 and system bus 918. It should be noted that other devices and/or systems of devices provide both input and output capabilities such as remote computer(s) 944.

Computer 912 can operate in a networked environment using logical connections to one or more remote computers, such as remote computer(s) 944. Remote computer(s) 944 can be a personal computer, a server, a router, a network PC, a workstation, a microprocessor based appliance, a peer device, or other common network node and the like, and typically includes many or all of the elements described relative to computer 912.

For purposes of brevity, only a memory storage device 946 is illustrated with remote computer(s) 944. Remote computer(s) 944 is logically connected to computer 912 through a network interface 948 and then physically connected by way of communication connection 950. Network interface 948 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 950 refer(s) to hardware/software employed to connect network interface 948 to bus 918. While communication connection 950 is shown for illustrative clarity inside computer 912, it can also be external to computer 912. The hardware/software for connection to network interface 948 can include, for example, internal and external technologies such as modems, including regular telephone grade modems, cable modems and DSL modems, ISDN adapters, and Ethernet cards.

Figure 10:
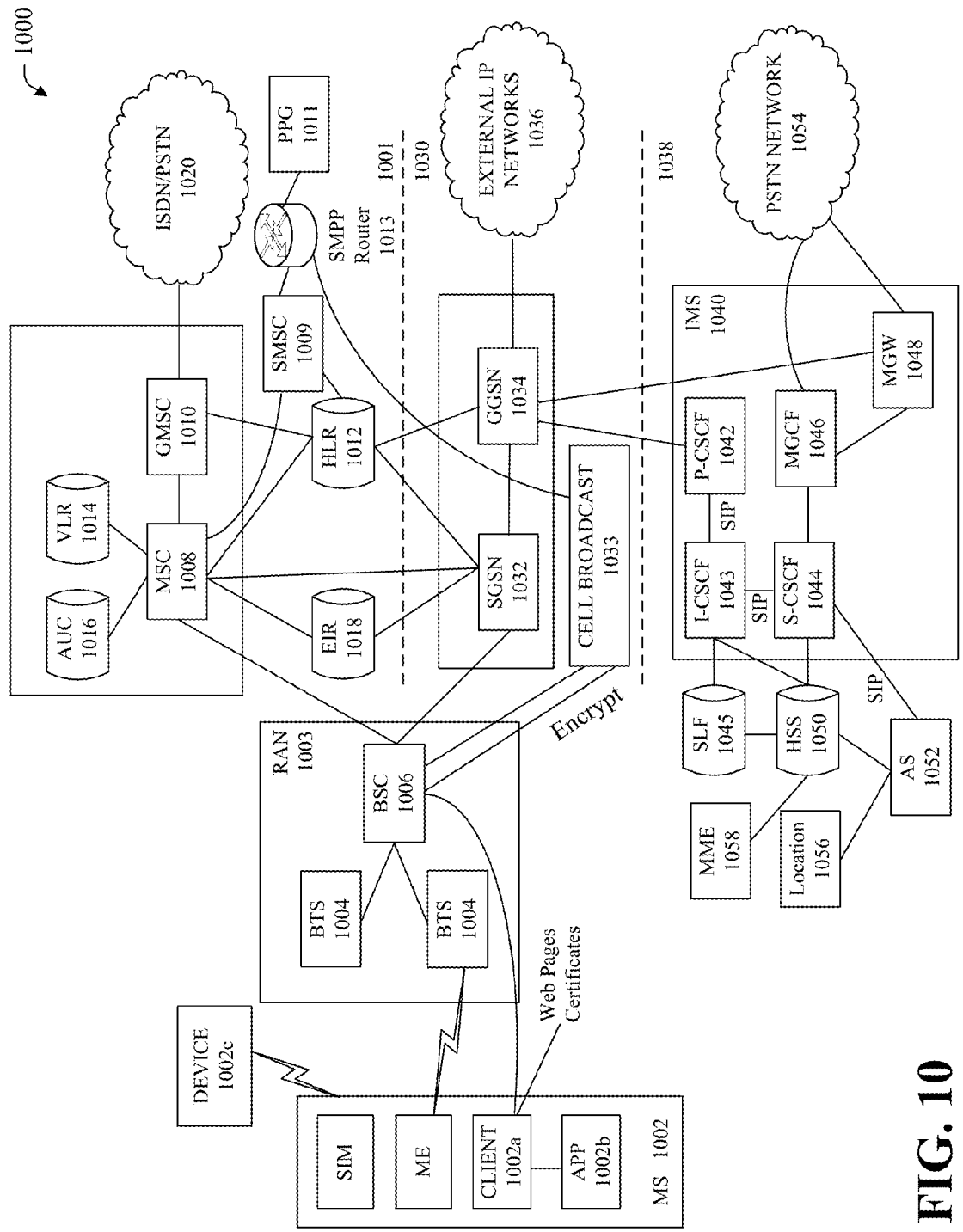
FIG. 10 illustrates a Global System for Mobile Communications (GSM)/General Packet Radio Service (GPRS)/Internet protocol (IP) multimedia network architecture that can employ the disclosed architecture.

Now turning to FIG. 10, such figure depicts an example GSM/GPRS/IP multimedia network architecture 1000 that can employ the disclosed communication architecture. In particular, the GSM/GPRS/IP multimedia network architecture 1000 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1002 includes an embedded client 1002a that receives and processes messages received by the MS 1002. The embedded client 1002a can be implemented in JAVA and is discuss more fully below. It can be appreciated that MS 1002 can be substantially similar to UE 202 and include functionality described with respect to UE 202 in systems 200-500.

The embedded client 1002a communicates with an application 1002b (e.g., application(s) 202) that provides services and/or information to an end user. Additionally or alternately, the MS 1002 and a device 1002c can be enabled to communicate via a short-range wireless communication link, such as BLUETOOTH®. As one of ordinary skill in the art would recognize, there can be an endless number of devices 1002c that use the SIM within the MS 1002 to provide services, information, data, audio, video, etc. to end users.

The BTS 1004 is physical equipment, such as a radio tower, that enables a radio interface to communicate with the MS 1002. Each BTS can serve more than one MS. The BSC 1006 manages radio resources, including the BTS. The BSC 1006 can be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1018. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. In other words, the GMSC 1010 provides interworking functionality with external networks.

The HLR 1012 is a database or component(s) that comprises administrative information regarding each subscriber registered in a corresponding GSM network. The HLR 1012 also includes the current location of each MS. The VLR 1014 is a database or component(s) that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. In one aspect, the BEX system 102 can obtain user related data from the HLR 1012 and/or the VLR 1014. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (e.g., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages. The notification component (e.g., 310 and 610) and the command recognition component (e.g., 210 and 520) can track SMS messages sent to and/or from the MS 1002.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations, security functions, and access controls.

A Cell Broadcast Center (CBC) 1033 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS 1002 through the SGSN 1032. When packet-switched data leaves the GPRS network, it is transferred to an external TCP-IP network 1036, such as an X.25 network or the Internet. In order to access GPRS services, the MS 1002 first attaches itself to the GPRS network by performing an attach procedure. The MS 1002 then activates a packet data protocol (PDP) context, thus activating a packet communication session between the MS 1002, the SGSN 1032, and the GGSN 1034. In a GSM/GPRS network, GPRS services and GSM services can be used in parallel. A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 can be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 can also modify an outgoing request according to a set of rules defined by the network operator (for example, address analysis and potential modification).

The I-CSCF 1043 forms an entrance to a home network and hides the inner topology of the home network from other networks and provides flexibility for selecting an S-CSCF. The I-CSCF 1043 can contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002. The MME 1058 provides authentication of a user by interacting with the HSS 1050 in LTE networks.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with a PSTN network 1054 for TDM trunks. In addition, the MGCF 1046 communicates with the PSTN network 1054 for SS7 links. According to an embodiment, the in-call command system 200, 300, and 400 can be implemented within and/or communicatively coupled to the GSM network 1001, the GPRS network 1030, the IP multimedia network 1038, and/or the IP networks 1036.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   monitoring a communication session for command data, the command data representing a command from a device associated with the communication session, wherein the communication session comprises communication of the command data and background communication data; and
   filtering the command data from the communication session, the filtering resulting in preventing the command data from being sent from the device to another device associated with the communication session, while the device is transmitting the background communication data to the other device.

2. The system of claim 1, wherein the filtering of the command data further comprises:
   generating replacement data to replace the command data in the communication session.

3. The system of claim 1, wherein the filtering of the command data further comprises:
   identifying the command from the communication session as a voice command.

4. The system of claim 3, wherein the identifying of the command as the voice command comprises recognizing the command as being a member of a set of voice commands.

5. The system of claim 3, wherein identifying the command as the voice command comprises identifying a trigger from the communication session, the trigger representing an initiation of the command.

6. The system of claim 5, wherein the trigger comprises voice data having a time length shorter than a delay time length associated with delay between transmissions of the communication session.

7. The system of claim 1, wherein the filtering of the command data further comprise:
   identifying the command from the communication session as a gestural command.

8. The system of claim 7, wherein the identifying of the command as the gestural command comprises recognizing the command as being a member of a set of gestural commands.

9. The system of claim 8, wherein the identifying of the command as the gestural command comprises recognizing the command based on a level of motion of a gesture being determined, based on an motion recognition process, to exceed a threshold.

10. The system of claim 1, wherein the operations further comprise:
    performing an instruction associated with the command.

11. The system of claim 10, wherein the performing the instruction comprises performing the instruction associated with the command selected from a set of commands comprising a first command that causes communication data associated with the device to be muted, a second command that causes other communication data associated with the other device to be suspended, and a third command that causes an addition of an addable device to the communication session to be initiated.

12. A non-transitory machine readable storage medium comprising executable instructions that, when executed by a processor, facilitate performance of operations, comprising:
    monitoring a communication session that comprises communication data for a command, wherein the command is distinct from background data in the communication data;
    in response to determining the command is present in the communication session, identifying a device, participating in the communication session, associated with the command; and
    filtering the command from the communication session to prevent delivery of the command to another device participating in the communication session while transmitting the background data to the other device.

13. The non-transitory machine readable storage medium of claim 12, wherein the filtering of the command further comprise:
   generating replacement data for the communication session for a time period associated with the prevention of delivery of the command.

14. The non-transitory machine readable storage medium of claim 13, wherein the operations further comprise:
   storing image data from the communication session, wherein the generating of the replacement data comprises utilizing at least a portion of the image data as the replacement data.

15. The non-transitory machine readable storage medium of claim 13, wherein the operations further comprise:
   storing a determined amount of video data from the communication session, wherein the generating of the replacement data comprises utilizing at least a portion of the video data as the replacement data.

16. The non-transitory machine readable storage medium of claim 12, wherein the operations further comprise performing an instruction that the device is determined not to be capable of performing.

17. The non-transitory machine readable storage medium of claim 12, wherein the prevention of the delivery of the command to the other device comprises:
   delaying a transmission of the communication session to the other device according to a defined function.

18. A method, comprising:
   monitoring, by a system comprising a processor, a communication session that comprises communication data to identify data representing a command, wherein the command is distinct from background data in the communication data;
   identifying, by the system, a device, associated with the communication session, that initiated the command;
   in response to identification of the data representing the command, filtering, by the system, the communication session to prevent the data representing the command from being sent to another device associated with the communication session while transmitting the background data to the other device; and
   performing, by the system, an instruction associated with the command.

19. The method of claim 18, wherein the filtering of the communication session further comprises:
   generating, by the system, replacement data to replace the data representing the command, the replacement data to be detected by the other device.

20. The method of claim 18, wherein the monitoring the communication session comprises determining whether a portion of the communication session matches a pattern associated with the data representing the command.

* * * * *